(12) United States Patent
Kageyama et al.

(10) Patent No.: US 12,631,480 B2
(45) Date of Patent: May 19, 2026

(54) WEIGHING APPARATUS

(71) Applicant: Ishida Co., Ltd., Kyoto (JP)

(72) Inventors: Toshiharu Kageyama, Ritto (JP);
Takahide Kasugai, Ritto (JP);
Kazuteru Oda, Ritto (JP); **Michio
Nishi**, Ritto (JP)

(73) Assignee: Ishida Co., Ltd., Kyoto (JP)

( * ) Notice: Subject to any disclaimer, the term of this
patent is extended or adjusted under 35
U.S.C. 154(b) by 317 days.

(21) Appl. No.: 18/441,485

(22) Filed: Feb. 14, 2024

(65) Prior Publication Data

US 2024/0280398 A1 Aug. 22, 2024

(30) Foreign Application Priority Data

Feb. 16, 2023 (JP) ................................ 2023-022693

(51) Int. Cl.
*G01G 13/00* (2006.01)

(52) U.S. Cl.
CPC ................................. *G01G 13/006* (2013.01)

(58) Field of Classification Search
CPC .. G01G 13/006; G01G 19/393; G01G 13/022;
G01G 23/00
USPC ........................................................ 177/161
See application file for complete search history.

(56) References Cited

U.S. PATENT DOCUMENTS

| | | | | |
|---|---|---|---|---|
| 4,561,509 A | * | 12/1985 | Sakakibara | .......... G01G 19/393 |
| | | | | 177/25.18 |
| 4,662,462 A | * | 5/1987 | Kitagawa | ............... G01G 13/18 |
| | | | | 177/25.18 |
| 5,340,949 A | * | 8/1994 | Fujimura | ............... G01G 17/04 |
| | | | | 426/231 |
| 2002/0011433 A1 | * | 1/2002 | Yamamoto | ............. G01G 13/18 |
| | | | | 209/645 |
| 2009/0101478 A1 | * | 4/2009 | Dale | ..................... G01G 13/248 |
| | | | | 198/572 |
| 2022/0244094 A1 | * | 8/2022 | Hansen | ................ G01G 19/393 |

FOREIGN PATENT DOCUMENTS

| | | | | |
|---|---|---|---|---|
| JP | H0894426 A | * | 4/1996 | |
| JP | 2007-198817 A | | 8/2007 | |

OTHER PUBLICATIONS

The extended European search report issued by the European Patent
Office on Jun. 26, 2024, which corresponds to European Patent
Application No. 24157116.5, and is related to U.S. Appl. No.
18/441,485.

* cited by examiner

*Primary Examiner* — Peter J Macchiarolo
*Assistant Examiner* — Mireille S Sadate-Moualeu
(74) *Attorney, Agent, or Firm* — Studebaker Brackett
PLLC

(57) ABSTRACT

A weighing apparatus (1) according to an embodiment
includes: adjacent hoppers (12A, 12B); and a sorting mecha-
nism (20) disposed between the adjacent hoppers (**12A,
12B), the sorting mechanism (20**) sorting an article given
from outside into one of the adjacent hoppers (12A, 12B), in
which the sorting mechanism (20) includes a rotator (21)
rotatable around a rotation shaft (21R), the rotation shaft
(21R) and a central axis (21C) of the rotator (21) are not
parallel, the rotator (21) rotates when the article abuts on the
rotator (21), and the rotator (21) does not rotate when the
article does not abut on the rotator (21).

3 Claims, 6 Drawing Sheets

WEIGHING APPARATUS

CROSS-REFERENCE TO RELATED APPLICATIONS

This application is based upon and claims the benefit of priority from Japanese Patent Application No. 2023-022693 filed on Feb. 16, 2023 in Japan, the entire contents of which are incorporated herein by reference.

TECHNICAL FIELD

The present invention relates to a weighing apparatus.

BACKGROUND ART

Conventionally, known has been a weighing apparatus including a rotator disposed rotatably at the boundary between adjacent hoppers, in which an article mounted on the rotator drops into either hopper. The rotator corresponds to a roller molded from resin or a rotary blade made of metal.

When an article mounts such a rotator, typically, the rotator gets unstable and then rotates, so that the article drops into either hopper.

However, for example, when a flat article like a thigh mounts the rotator in a balanced manner, the rotator does not rotate, so that the article remains on the rotator. In such a case, the article is left between the hoppers for a long time as an undesirable problem.

Thus, in order to solve the problem, known has been a weighing apparatus including a rotator that is coupled to a motor and rotates based on the motor.

SUMMARY OF THE INVENTION

However, the weighing apparatus described above is expensive in cost and is disadvantageous in cleaning as undesirable problems because the motor is disposed between adjacent hoppers.

Thus, the present invention has been made in consideration of the above problems and an object of the present invention is to provide a weighing apparatus enabling an article supplied between adjacent hoppers to drop reliably into either hopper, with a simple configuration.

A weighing apparatus according to an embodiment includes: adjacent hoppers; and a sorting mechanism disposed between the adjacent hoppers, the sorting mechanism being configured to sort an article given from outside into one of the adjacent hoppers, in which the sorting mechanism includes a rotator rotatable around a rotation shaft, the rotation shaft and a central axis of the rotator are not parallel, the rotator rotates when the article abuts on the rotator, and the rotator does not rotate when the article does not abut on the rotator.

According to the present invention, provided can be a weighing apparatus enabling an article supplied between adjacent hoppers to drop reliably into either hopper, with a simple configuration.

DESCRIPTION OF EMBODIMENTS

Preferred embodiments of the present invention will be described in detail below with reference to the accompanying drawings. Note that, in the following drawings, the same or similar parts are denoted with the same or similar reference signs. It should be noted that the drawings are schematic and, for example, the ratio between each dimension is different from the real. Therefore, for example, specific dimensions should be understood in consideration of the following descriptions. In addition, parts between each drawing may be different in dimensional relationship or dimensional ratio. In the present specification and the drawings, constituents substantially identical in function or configuration are denoted with the same reference signs and thus duplicate descriptions thereof will be omitted. In addition, any constituents not directly related to the present invention are not illustrated.

First Embodiment

Figure 1:
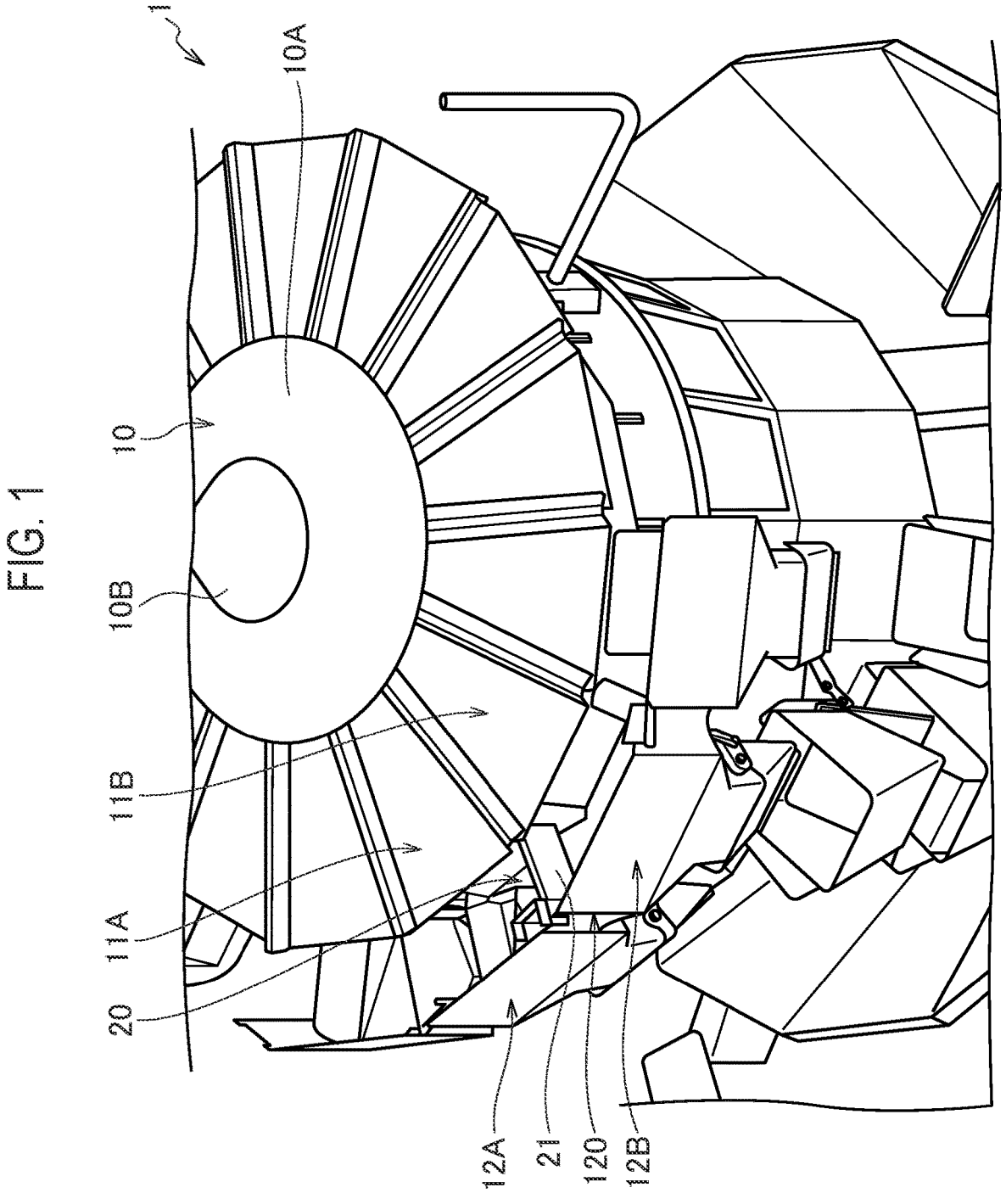
FIG. 1 a diagram for describing an example of a configuration of a weighing apparatus 1 according to an embodiment.
Figure 2:
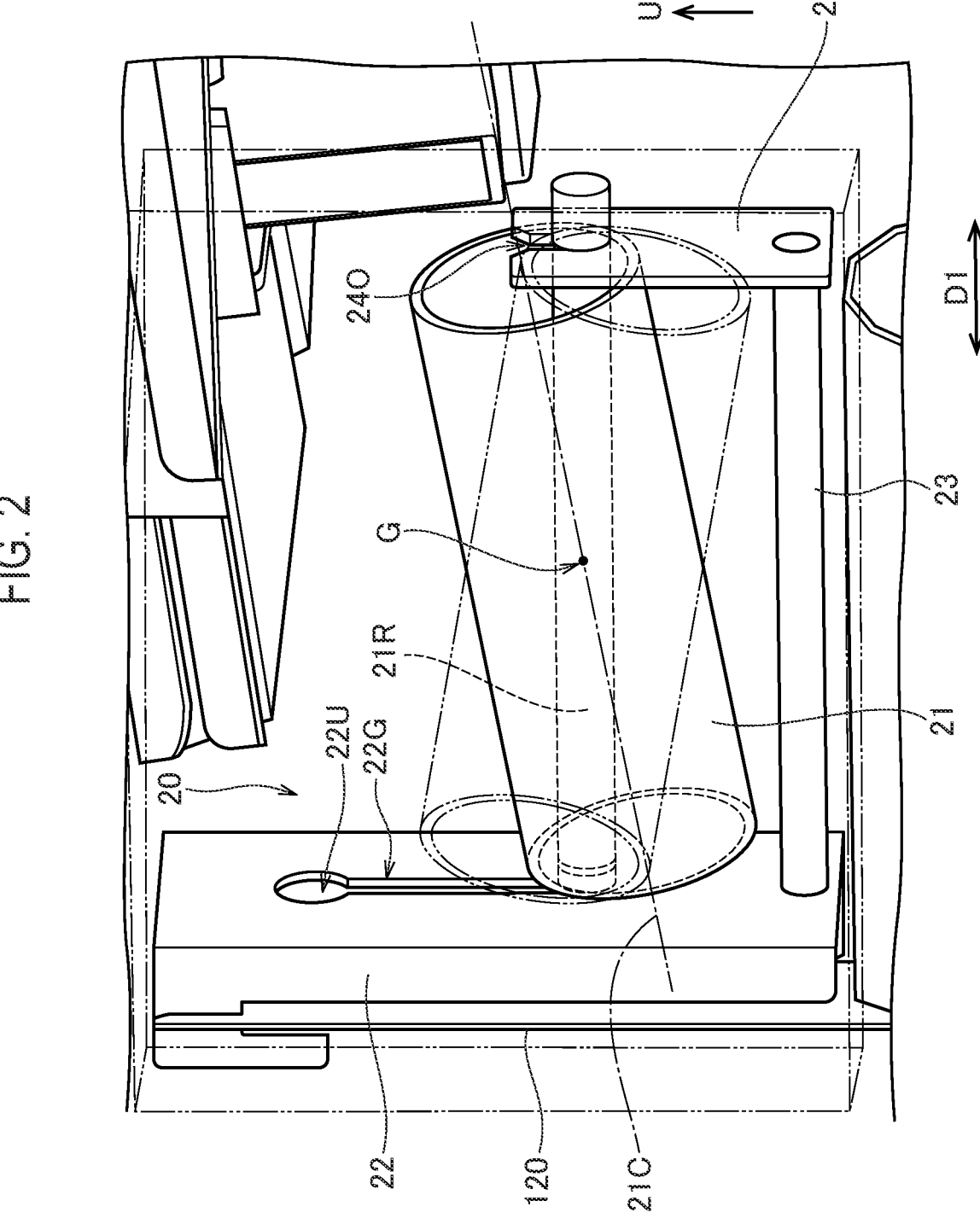
FIG. 2 is a diagram for describing an example of a rotator 21 in the weighing apparatus 1 according to the embodiment.
Figure 3:
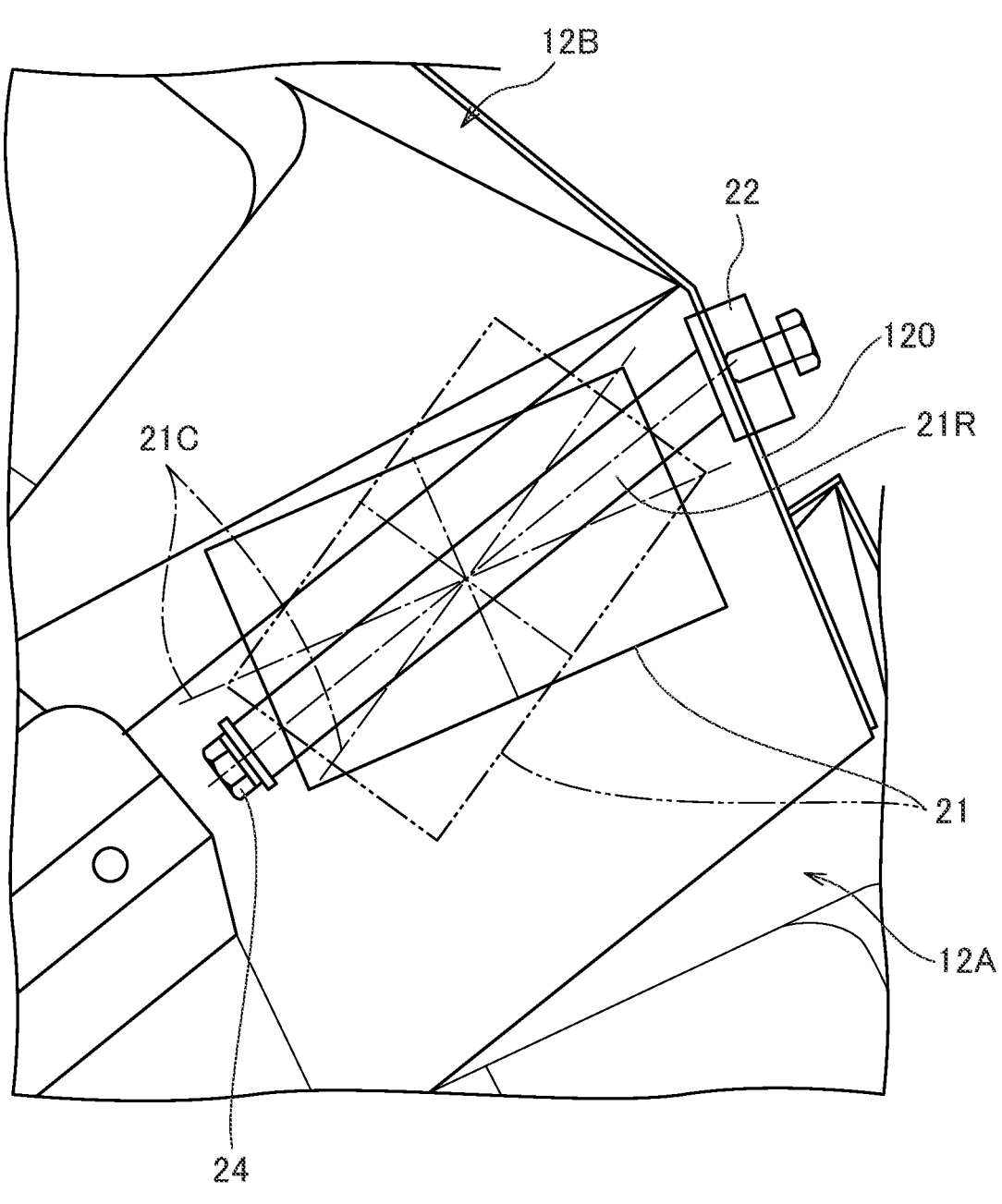
FIG. 3 is a diagram for describing an example of a rotator 21 in the weighing apparatus 1 according to the embodiment.

A weighing apparatus 1 according to a first embodiment of the present invention will be described below with reference to FIGS. 1 to 3. FIG. 1 a diagram for describing an example of a configuration of a weighing apparatus 1 according to a first embodiment, and FIGS. 2 and 3 are diagrams for describing an example of a rotator 21 in the weighing apparatus 1 according to the first embodiment.

As illustrated in FIG. 1, the weighing apparatus 1 according to the present embodiment includes a distribution table 10, a plurality of supply troughs 11A and 11B, a plurality of pool hoppers 12A and 12B, and a sorting mechanism 20.

The distribution table 10 receives articles given from outside and distributes the articles downstream. Note that, in the present embodiment, as illustrated in FIG. 1, the distribution table 10 includes a first part 10A frustoconical in shape and a second part 10B conical in shape on the upper base face of the first part 10A.

The plurality of supply troughs 11A and 11B is provided corresponding one-to-one to the plurality of pool hoppers 12A and 12B and supplies the articles received from the distribution table 10 to the plurality of pool hoppers 12A and 12B, respectively. The supply troughs 11A and 11B are disposed radially.

For example, the distribution table 10 and the supply troughs 11A and 11B are each vibrated by the drive of a vibrator, so that the articles on the distribution table 10 are supplied to the plurality of pool hoppers 12A and 12B downstream of the supply troughs 11A and 11B, respectively.

The plurality of pool hoppers 12A and 12B temporarily stores the articles supplied from the supply troughs 11A and 11B, respectively, and then discharges the articles downstream.

The sorting mechanism 20 is disposed between adjacent pool hoppers (e.g., the pool hoppers 12A and 12B) and sorts an article given from the supply trough 11A or 11B (from outside) into one of the adjacent pool hoppers (e.g., the pool hoppers 12A and 12B).

As illustrated in FIGS. 1 to 3, the sorting mechanism 20 includes a rotator 21 rotatable around a rotation shaft 21R. As illustrated in FIGS. 2 and 3, the rotator 21 is cylindrical in shape, extending along a central axis 21C. The rotator 12 is, for example, a roller molded from resin.

As illustrated in FIGS. 2 and 3, the rotation shaft 21R and the central axis 21C of the rotator 21 are not parallel. In addition, the rotation shaft 21R and the central axis 21C pass through the center of gravity G of the rotator 21 cylindrical in shape.

Thus, the rotator 21 rotates when an article supplied from the supply trough 11A or 11B abuts on or mounts the rotator 21. The rotator 21 does not rotate when no article abuts on the rotator 21.

That is, since the rotation shaft 21R intersects the central axis (symmetrical axis) 21C of the rotator 21 at the center of gravity G of the rotator 21, when no article mounts the rotator 21, the center of gravity G of the rotator 21 is located on the central axis (symmetrical axis) 21C. Thus, even when vibrations are applied to the rotator 21, the symmetry with respect to the position of the center of gravity G remains kept, leading to no rotation. However, when an article mounts the rotator 21, the position of the center of gravity of the rotator 21 involving the article deviates from the central axis (symmetrical axis) 21C of the rotator 21. Due to the deviation, the moment of rotation acts on the rotator 21, so that the rotator 21 rotates reliably. Thus, when an article mounts or comes in contact with the rotator 21, the rotator 21 rotates reliably, without any motor, to drop the article into either pool hopper (e.g., the pool hopper 12A or 12B).

Since the rotator 21 does not rotate when no article abuts on the rotator 21, the rotation shaft 21R for the rotator 21 can be inhibited from being worn.

Specifically, as illustrated in FIGS. 2 and 3, the sorting mechanism 20 includes a bracket 22, a rod 23, and a fastener 24, in addition to the rotator 21.

As illustrated in FIGS. 2 and 3, the bracket 22 is hooked on the upper end of a coupler 120 coupling the adjacent pool hoppers 12A and 12B together and is secured to the coupler 120.

As illustrated in FIG. 2, the rod 23 has an end attached to the lower end portion of the bracket 22 extending vertically and extends in the extending direction D1 of the rotation shaft 21R. As illustrated in FIG. 2, the fastener 24 extending vertically is attached to the other end of the rod 23 and extends from the other end in an up direction U.

As illustrated in FIG. 2, after an end of the rotation shaft 21R for the rotator 21 is inserted through a large-diameter hole 22U at the upper end portion of a groove 22G of the bracket 22 and the other end is inserted in an opening 24O in the up direction U provided in the fastener 24, respective ring-shaped grooves, not illustrated, at both ends of the rotation shaft 21R detachably fit the groove 22G and the opening 24O.

In a case where articles are perishable products, when the operation is terminated, every part having had contact with the articles requires detaching from the apparatus body and cleaning. The configuration above facilitates disassembly and cleaning, so that a reduction can be made in the time required for cleaning.

As described above, according to the present embodiment, due to a simple configuration without any motor, an article supplied between the adjacent pool hoppers 12A and 12B can reliably drop into one of the pool hoppers 12A and 12B.

Modification 1

Modification 1 of the present invention will be described below with reference to FIGS. 4 to 6.

Figure 4:
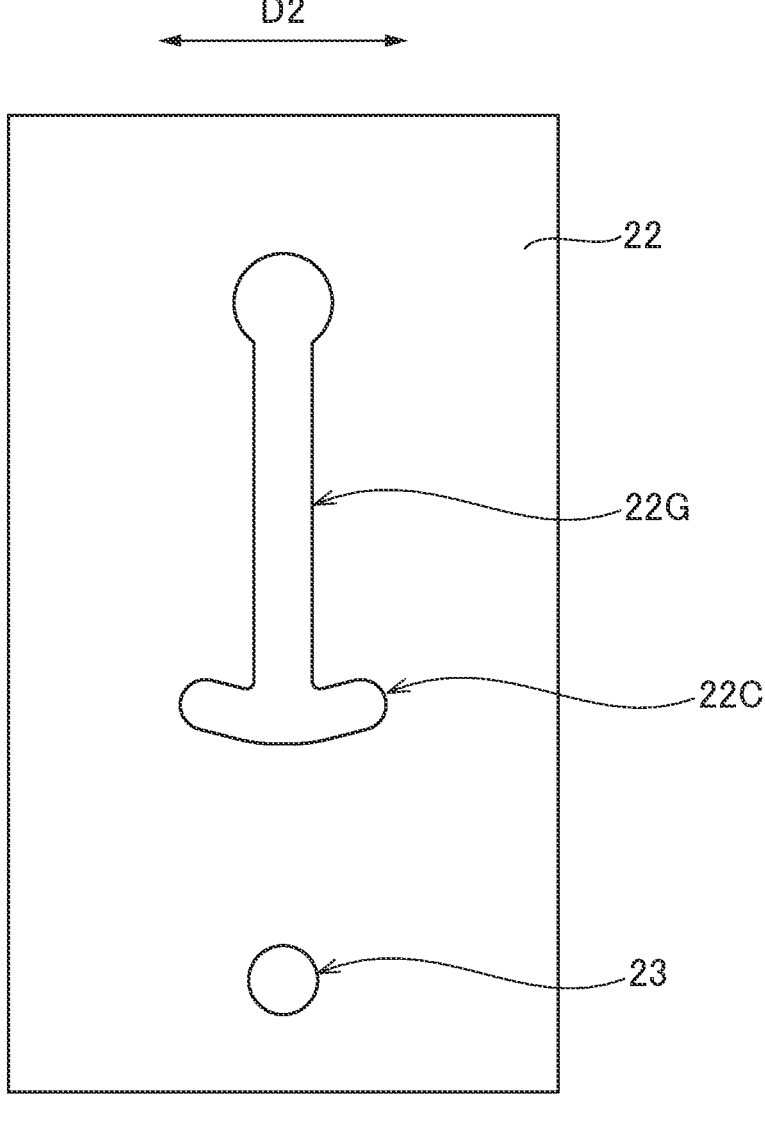
FIG. 4 is a diagram for describing a weighing apparatus 1 according to a modification 1.

As illustrated in FIG. 4, according to Modification 1, a bracket 22 has a groove 22G having its lower end portion provided with a cutout 22C.

As illustrated in FIG. 4, the cutout 22C extends in a direction D2 orthogonal to the extending direction D1 of a rotation shaft 21R. Specifically, as illustrated in FIG. 4, the cutout 22C extends gradually upward while extending outward in the direction D2.

Figure 5:
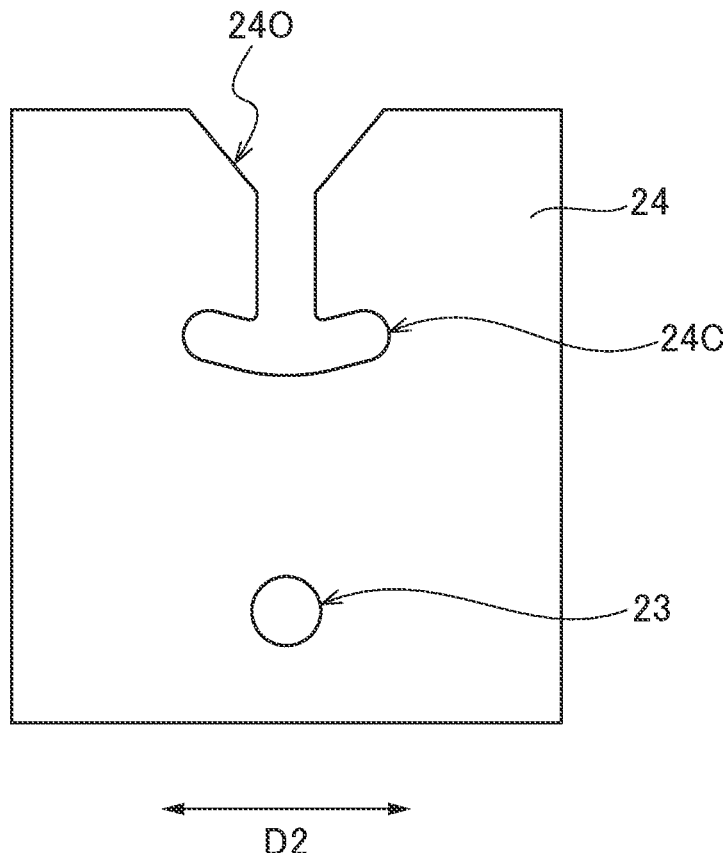
FIG. 5 is a diagram for describing a weighing apparatus 1 according to a modification 1.
Figure 6:
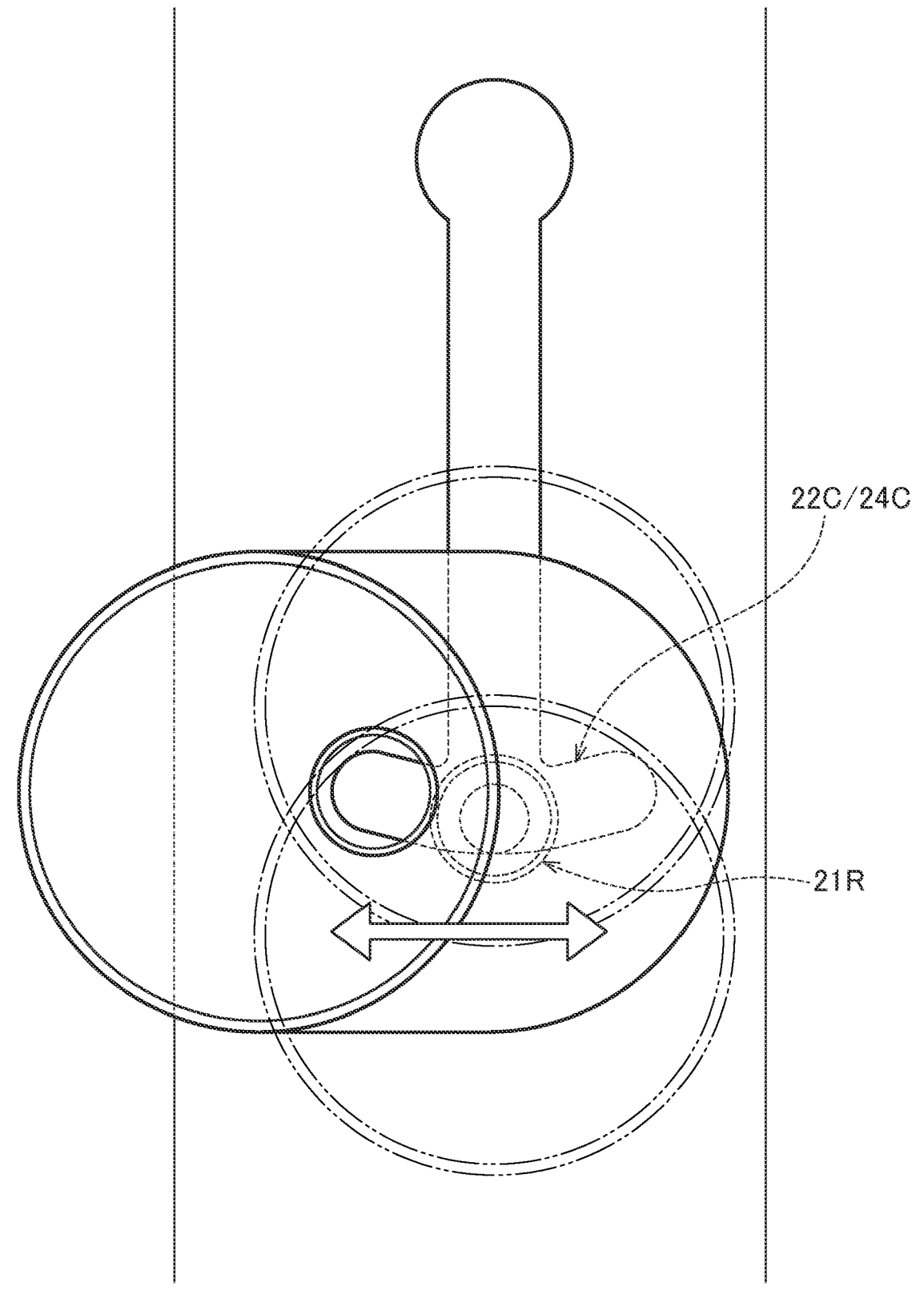
FIG. 6 is a diagram for describing a weighing apparatus 1 according to a modification 1.

As illustrated in FIG. 5, according to Modification 1, a fastener 24 has an opening 24O having its lower end portion provided with a cutout 24C.

As illustrated in FIG. 5, the cutout 24C extends in the direction D2 described above. Specifically, as illustrated in FIG. 5, the cutout 24C extends gradually upward while extending outward in the direction D2. The cutout 22C and the cutout 24C may be identical in shape.

According to the configuration above, when an article mounts a rotator 21, the rotator 21 rotates as described above. In addition, as illustrated in FIG. 6, the rotation shaft 21R moves along the cutouts 22C and 24C, so that the article can more reliably drop into either pool hopper (e.g., a pool hopper 12A or 12B).

The present invention has been described in detail with the embodiments above. It is obvious to those skilled in the art that the present invention is not limited to the embodiments in the present specification. The present invention can be carried out in aspects modified and altered without departing from the gist and scope of the present invention in the claims. Therefore, the present specification is intended for exemplificative description and thus does not have any limitative meanings to the present invention.

What is claimed is:

1. A weighing apparatus comprising:
adjacent hoppers; and
a sorting mechanism disposed between the adjacent hoppers, the sorting mechanism sorting an article given from outside into one of the adjacent hoppers, wherein
the sorting mechanism includes a rotator rotatable around a rotation shaft,
the rotation shaft and a central axis of the rotator are not parallel,
the rotator rotates when the article abuts on the rotator, and
the rotator does not rotate when the article does not abut on the rotator.

2. The weighing apparatus according to claim 1, wherein the rotator does not rotate at any position for rotation when the article does not abut on the rotator.

3. The weighing apparatus according to claim 1, wherein the sorting mechanism includes:
a bracket hooked on an upper end of a coupler that couples the adjacent hoppers together, the bracket being secured to the coupler;
a rod attached to the bracket, the rod extending in an extending direction of the rotation shaft; and
a fastener attached to the rod, the fastener extending in an up direction, and the rotation shaft for the rotator is inserted in a groove of the bracket and is inserted in an opening in the up direction provided in the fastener.

* * * * *